W. T. IVEY.
AUTOMOBILE TIRE TOOL.
APPLICATION FILED JAN. 9, 1920.

1,388,717.

Patented Aug. 23, 1921.
2 SHEETS—SHEET 1.

WITNESS:
Benj Kahn

INVENTOR.
BY W. T. Ivey
Victor J. Evans
ATTORNEY

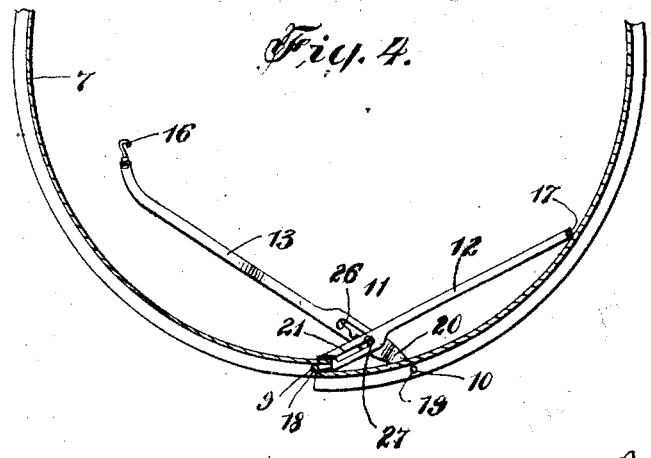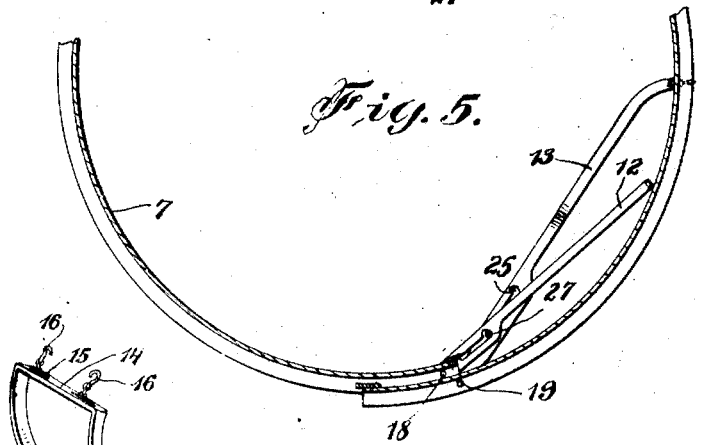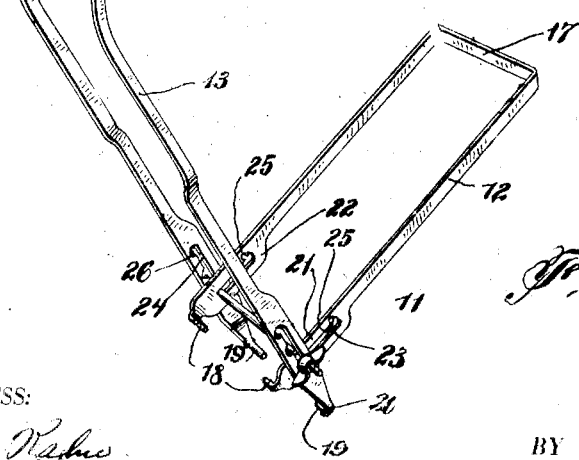

UNITED STATES PATENT OFFICE.

WILLIAM T. IVEY, OF LYONS, GEORGIA.

AUTOMOBILE-TIRE TOOL.

1,388,717.  Specification of Letters Patent.  Patented Aug. 23, 1921.

Application filed January 9, 1920. Serial No. 350,337.

*To all whom it may concern:*

Be it known that I, WILLIAM T. IVEY, a citizen of the United States, residing at Lyons, in the county of Toombs and State of Georgia, have invented new and useful Improvements in Automobile-Tire Tools, of which the following is a specification.

The present invention has reference to an automobile tire tool and has for its primary object to provide means whereby the removal or replacing of a tire to and from a split rim of any ordinary construction may be performed in an easy and expeditious manner with a minimum amount of exertion by the operator.

Other objects and advantages will appear as the nature of the invention is better understood, reference being had to the accompanying drawings in which there is illustrated a simple and satisfactory reduction of the improvement to practice.

In the drawings:

Fig. 4 is a longitudinal sectional view showing the rim partly collapsed.

Fig. 5 is a longitudinal sectional view showing the rim totally collapsed.

Fig. 6 is a perspective view of the tool.

Figure 1:
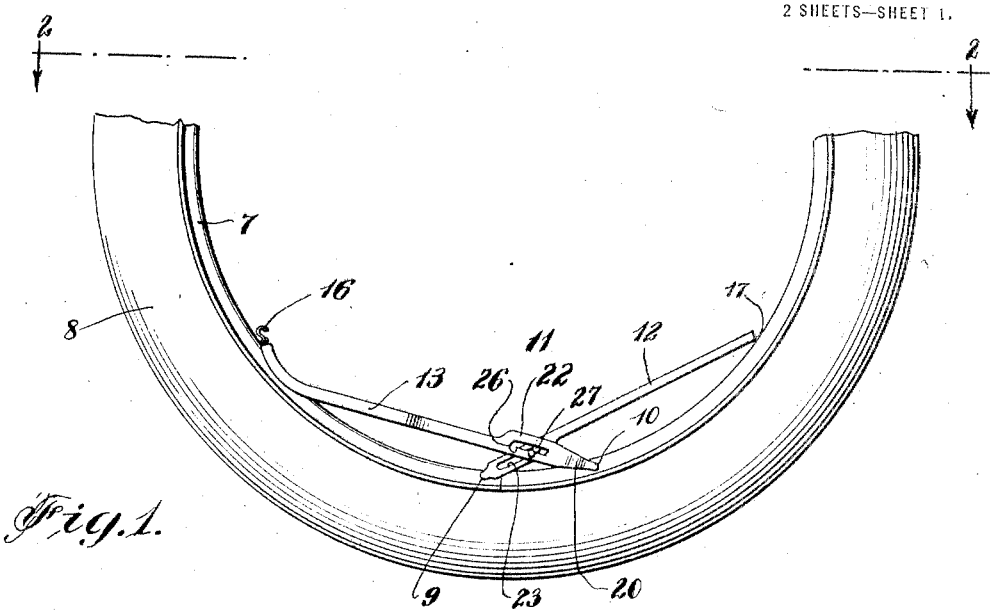
Figure 1 is a side elevation of a portion of a tire carrying rim and tire with the tool attached.
Figure 2:
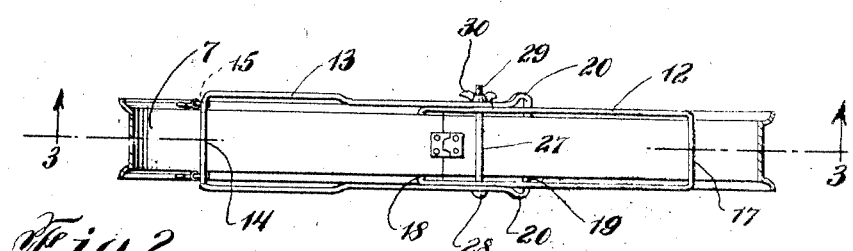
Fig. 2 is a sectional view approximately on the line 2—2 of Fig. 1.
Figure 3:
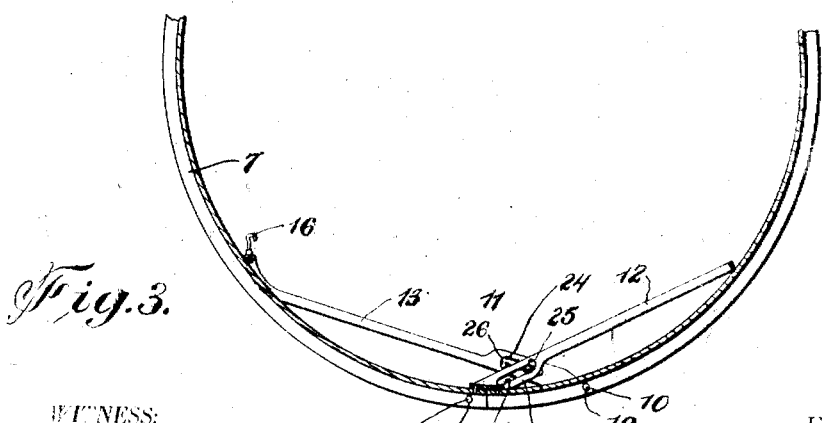
Fig. 3 is a longitudinal sectional view approximately on the line 3—3 of Fig. 2.

The split rim 7 that carries the pneumatic tire 8 is provided adjacent its confronting ends and on its opposite sides with sockets 9 and 10 respectively, the sockets 9 being arranged nearer the end of the rim than the sockets 10.

My improved rim tool is broadly indicated by the numeral 11 and comprises an inner yoke-shaped member 12 and an outer yoke-shaped member 13. The arms of the members 12 and 13 are parallel, the arms of the outer member 13 being of a greater length than those of the inner member 12. The connecting member 14 for the arms of the outer member 13 is provided with elongated slots 15, and in these slots are adjustable hooks 16. It should be stated that the arms of both the members 12 and 13 are preferably arched at their outer ends, that is, at their ends provided with the connecting elements for their arms. The connecting member for the arms of the member 12, indicated for distinction by the numeral 17, as well as the connecting member 14 for the arms of the member 13 serve as hand holds for the operation of the tool. The arms of the members 12 and 13 at their free ends are formed with inwardly extending lugs 18 and 19 respectively, the arms of the member 13 being offset in an outward direction, as at 20 at the juncture of the lugs 19 with the said arms. The arms of the members 12 and 13, inward of their lugs are widened as at 21 and 22 respectively, and these widened portions are provided with elongated slots 23 and 24 respectively. The slots 23 at the inner ends thereof have notches 25 communicating therewith, and communicating with the slots 24 of the arms of the member 13, inward of the ends of the said slots, but nearer one of the ends than the other, are notches 26 that communicate with the slots.

Passing through the slots 23 and 24 is what I will term a shaft member 27. This shaft has one of its ends headed as at 28 and its opposite end threaded as at 29, and the said threaded end is engaged by a thumb screw 30.

In operation the lugs 18 are arranged in the sockets 9 of the rim while the lugs 19 are arranged in the sockets 10. The members 12 and 13 are opened and spread away from each other so that the same lie flat on the rim. The member 12 is grasped by one of the hands of the operator at the part 17 thereof and the member 13, at the portion 14 thereof is grasped by the other hand of the operator, and the said members are pulled together which causes the axle 27 to automatically drop in the slots of the members 12 and 13. A slight push is now exerted on the member 12 in a downward direction and a pull is exerted on the member 13 in an upward direction. This trips the members and at the same time laps the rim approximately one-half inch. At this point the operator relaxes his hold, the rim being held in lapping position by pressure or by the elasticity of the tire, while the tool is also relaxed. The members 13 and 14 are now slightly spread and in this manner the axle automatically falls in the bottom of the slot 24 in the member 13, while a raise or pull is exerted upon the member 13 in a forward direction until it reaches the rim, at which point the hooks 16 are applied to the flange of the rim meeting no resistance for the reason that no air is in the tire, at this point the rim stands lapped four and one-half to five inches and is firmly fastened by the hooks. The pressure and the leverage is so balanced that the last-described pull on the member 13 automatically pulls the member 12 forward or ahead of the member 13 and holds in this position after fastening the hook 16 as described, and an additional lap of two and one-half inches or thereabout can be made by pulling the member 12 back through the member 13.

Having thus described the invention, what is claimed as new is:—

A tool for split auto rims comprising an outer yoke-shaped member, including a pair of parallel arms having alined notched elongated slots therein adjacent the free ends thereof and a connecting member having spaced elongated slots therein, adjustable hooks slidably mounted in the slots in said connecting member, inwardly extending lugs formed integrally with the free ends of said arms, an inner yoke-shaped member of a shorter length than the outer yoke-shaped member, including a pair of spaced parallel arms having alined elongated slots therein adjacent to the free ends thereof and a connecting member forming an operating handle therefor, inwardly extending lugs formed integrally with the free ends of the last mentioned arms, a headed shaft provided with a threaded end passing through the slots in the arms of said yoke-shaped members and loosely connecting the same and a thumbscrew carried by the threaded end of said shaft.

In testimony whereof I affix my signature.

WILLIAM T. IVEY.